United States Patent
Haapakoski

[11] Patent Number: 5,917,479
[45] Date of Patent: Jun. 29, 1999

[54] METHOD FOR REDUCING POWER CONSUMPTION IN A MONITOR

[75] Inventor: Hannu Haapakoski, Salo, Finland

[73] Assignee: Nokia Technology GmbH, Pforzheim, Germany

[21] Appl. No.: 08/841,067

[22] Filed: Apr. 29, 1997

[30] Foreign Application Priority Data

May 6, 1996 [FI] Finland ................................. 961913

[51] Int. Cl.$^6$ .......................... G09G 5/00; H04N 3/20; G06F 1/00
[52] U.S. Cl. ...................... 345/211; 345/212; 345/213; 348/173; 364/707
[58] Field of Search .................. 345/10, 11, 211, 345/212; 395/750.01, 750.05, 750.04, 750.07, 750.02, 750.03, 750.06; 348/173; 364/707

[56] References Cited

U.S. PATENT DOCUMENTS

| | | | |
|---|---|---|---|
| 5,375,245 | 12/1994 | Soihjell et al. | 395/750 |
| 5,389,952 | 2/1995 | Kikinis | 345/212 |
| 5,481,299 | 1/1996 | Coffey et al. | 348/123 |
| 5,513,361 | 4/1996 | Young | 395/750 |
| 5,616,988 | 4/1997 | Kim | 315/1 |
| 5,623,286 | 4/1997 | Morimoto et al. | 345/212 |
| 5,659,371 | 8/1997 | Krause | 348/730 |

*Primary Examiner*—Dennis-Doon Chow
*Assistant Examiner*—Amr Awad
*Attorney, Agent, or Firm*—Ware, Fressola, Van Der Sluys & Adolphson LLP

[57] ABSTRACT

The invention relates to a method and arrangement for managing the power control of a monitor. In the solution according to the invention the monitor synchronizing signals are not monitored continuously in the OFF state but the monitoring is periodic. The solution according to the invention can be applied to all different kinds of display terminals and monitors.

13 Claims, 1 Drawing Sheet

METHOD FOR REDUCING POWER CONSUMPTION IN A MONITOR

TECHNICAL FIELD

The invention relates to reducing power consumption in a monitor.

BACKGROUND OF THE INVENTION

Often, in an office, for example, a monitor is switched on in the morning and again switched off for the night. The monitor is thus on for the whole day and consumes energy even though its effective operation time may be just a fraction of the length of the working day. In some offices, the monitors are not shut down at all between working days. Therefore, several different solutions have been developed to reduce the power consumption of display units and monitors.

A known solution, which is aimed at prolonging the life of the picture tube rather than saving energy, is to use a computer program which blanks the screen when the system has not been used for a while. The main purpose of such a function is to prevent unchanging patterns from being burnt into the fluorescent material of the picture tube. At its simplest, this kind of function turns off the video signal from the display adapter.

Considerable energy savings are achieved with a monitor arrangement that switches the monitor off when a certain period has elapsed during which the system has not been used. This can be achieved e.g. using a circuit which recognizes that the video signal is missing and, for the duration of the signal absence, turns off the power for those parts of the monitor that consume the most power. With this arrangement, the power consumption of a monitor can be reduced to 5 to 8 W in the power saving state.

The video electronics standards association, VESA, has specified a display power management signaling (DPMS) system based on monitor synchronization signals. In the DPMS system, a monitor has four different states:

ON, which corresponds to the normal operation of the monitor;

Stand-by, wherein the screen is blanked, for example, thus achieving a small decrease in power consumption;

Suspend, wherein a major part of the monitor functions are switched off, and;

OFF, where almost all functions of the monitor are switched off.

The most significant power savings are achieved in the Suspend and OFF states.

In the DPMS system the monitor is driven to the desired state on the basis of vertical and horizontal synchronization pulses. The monitor has to be able to read the desired state from the vertical and horizontal synchronization pulse levels and to switch to the operating level specified by the synchronization pulses. The table below shows the synchronization pulse states corresponding to the various states.

| Power saving state | Horizontal sync pulses | Vertical sync pulses |
| --- | --- | --- |
| ON | Yes | Yes |
| Stand-by | No | Yes |
| Suspend | Yes | No |
| OFF | No | No |

In the table, 'Yes' means that the frequency and pulse ratio of the input signal exceed a limit value defined in the DPMS system. Similarly, 'No' means the frequency and pulse ratio of the input signal are below the limit value in question.

In a solution according to the DPMS system, the circuit reading the synchronization signals has to be able to measure the frequency and pulse ratio of the synchronization pulses, if required. The solution also has to be able to verify the current situation to avoid errors when the display adapter changes resolution, for example. In addition, energy is needed for reading the synchronization pulses and that energy cannot be taken from the display adapter, due to the technology applied. A common way of dealing with the synchronization pulse reading and monitor control is to use the monitor's microprocessor.

A solution widely used with the DPMS system is a so-called soft power switch. That means a device does not contain an actual mains power switch to switch off the power, but that switch is replaced by a switch located in connection with the processor. By means of that switch the device can be driven to the OFF state irrespective of the synchronization signal levels. To the user, the OFF state appears as if the device was switched off by a mains power switch.

At the moment there are three types of solutions for supplying power to the secondary of the power supply unit during the extreme power saving state, or the OFF state:

power is supplied from the mains to the power supply secondary in the normal manner by means of the main power supply unit, power is supplied from the mains to the power supply secondary by means of passive components such as capacitors, and a separate power source is used.

In a first version of the solution applying the main power supply the secondary of the power supply includes switching elements that disconnect parts of the system that consume power. The disconnection can be done by switching off the control signals or the operating voltages of the parts. In the suspend state, high-power blocks are disconnected. In the OFF state, all parts except the microprocessor or a corresponding circuit reading the synchronization signals and controlling the device are disconnected. In this kind of solution, the power supply unit of the device operates all the time and produces continuous stabilized operating voltages for the secondary. The advantage of the solution is its simplicity, but the efficiency of the power supply is poor. In addition, the solution requires many switching elements if there are several operating voltages.

In a second version of the solution applying the main power supply the operating voltages of the secondary are stabilized in the OFF state to a substantially lower level than in a normal operating situation, thus preventing the operation of the circuits loading the secondary and reducing the power consumption of the circuits to a low level. In practice, this is normally done by stabilizing a high stabilized operating voltage of the secondary, say, 150 volts, which is used for generating the other operating voltages of the secondary, to a level of about 8 volts. The operating voltage (+5 V, for example) for the processor is obtained from the reduced operating voltage by means of a regulator. The stabilization of voltages to a lower level in this version corresponds to the switches of the first version. In addition to the voltage reduction element it needs a switch that connects the reduced secondary voltage as the operating voltage for the processor for the duration of the power saving state. The advantage of the solution is still its simplicity, and at the same time the efficiency of the power supply is slightly improved because the voltage amplitudes generated in the power supply are smaller than in the first solution. The complexity of the circuit does not depend on the number of operating voltages as all operating voltages are reduced at the same time.

In a third version of the solution applying the main power supply, the operation of the power supply is not continuous but energy is supplied to the secondary in pulses. This further improves the efficiency of the power supply. In this kind of system, the operating voltages of the secondary are not stable during the power saving state but they contain oscillation at the pulse frequency. However, the processor is supplied a sufficient amount of operating voltage all the time and its operation is not interrupted.

The second basic solution uses passive components such as capacitors to transfer power from the mains to the secondary. The capacitive current of the capacitors is rectified and filtered in the secondary into a DC voltage. In order for the obtained power to be sufficient for ordinary processors, the capacitance of the capacitors must be high, which means that their physical size and the costs will increase.

SUMMARY OF THE INVENTION

In systems applying a separate power source, the second power source is used when the main power supply is switched off. The separate power source is optimized for low power levels and it normally feeds only the processor. The advantage of such a system is its reliable operation and good efficiency of the power source. The disadvantage is that two power supply units are needed, which increases component costs.

An object of the present invention is to provide, using as few additional components as possible, a power saving method for the OFF state which is more effective than those according to the prior art. Another object of the invention is to provide a method which uses as much of the existing components in monitors as is possible.

The objects are achieved by making the monitoring of synchronization signals in the OFF state periodic. In the system according to the invention, the power supply operates in pulses, which means that between pulses the power is cut off also from the processor of the monitor. The length of a pulse suffices for the processor to read the current state of the system and the input synchronization signals and, if necessary, to drive the power supply of the device into normal operation.

The invention relates to a method wherein said control signals are monitored periodically during the power saving state.

The invention also relates to a system characterized in that the operating state control signal monitoring element is arranged such that it operates in a periodic fashion.

BRIEF DESCRIPTION OF THE DRAWING

The invention is described in more detail with reference to the illustrative embodiments presented as examples and to FIG. 1, which is a schematic illustrating the principle of the system according to the invention.

BEST MODE FOR CARRYING OUT THE INVENTION

Figure 1:
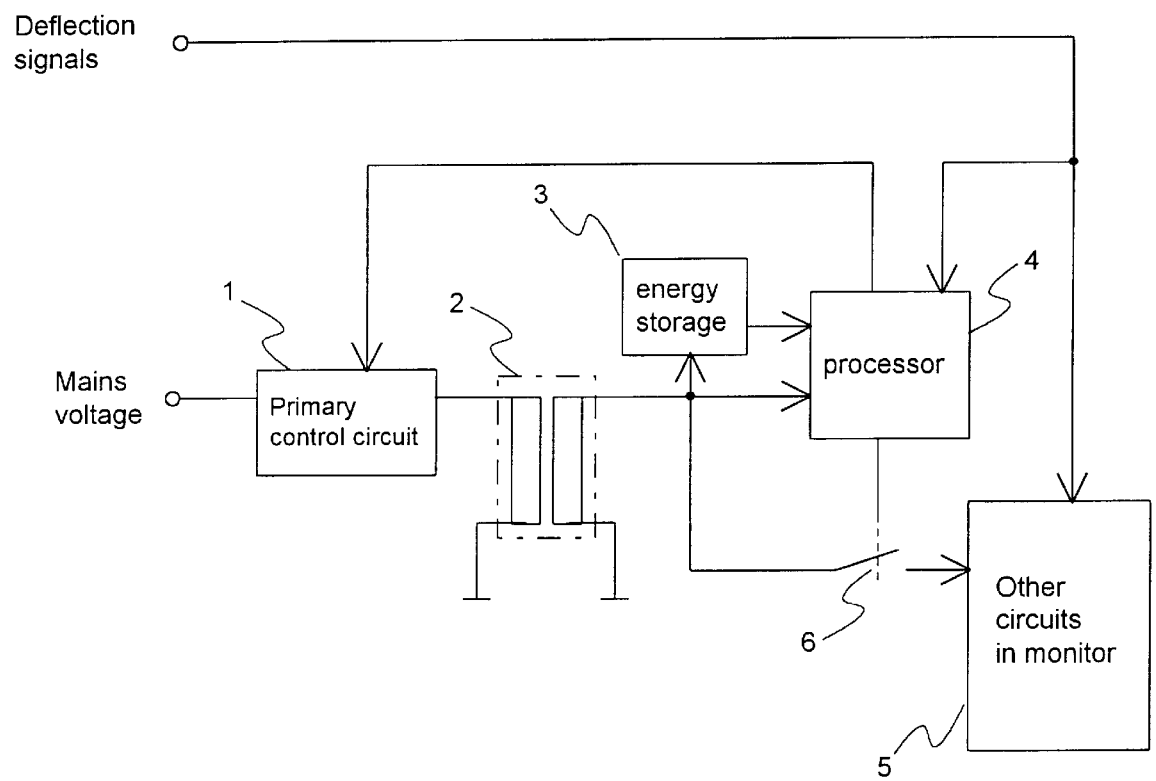

In the method according to the invention, the power-consuming blocks are switched off when the device enters the OFF state from the normal state. Furthermore, the power supply (1, 2) of the system operates in a pulsating fashion in the OFF state, which means that the processor (4) or a corresponding circuit reading the synchronization signals gets its operating voltage only part of the time. After an energy pulse the power supply (1, 2) is completely switched off and the operating voltage of the processor (4) drops to zero. The energy of one pulse is sufficient for the processor (4) to determine the current state of the system and to read the input synchronization signals and, if required, to drive the power supply (1, 2) of the device into normal operation.

Periodic operation is feasible because the warm-up time of a monitor is normally relatively long, about 10 seconds, and the small additional delay caused by the periodic operation is insubstantial. Therefore, the load on the power supply and at the same time the power supply for the secondary can be divided into short periods instead of continuous operation in order to reduce the overall power consumption of the device.

When the operating voltage is high the processor (4) examines the current state of the device and the states of the synchronization signals. The power consumption of the device then comprises the power consumption by the processor and its peripheral circuits and the power losses in the power supply unit. When the operating voltage is low, the processor does not consume any energy. Since the whole secondary is switched off, the power losses in the power supply unit are small, about 400 mW. Therefore, the system's overall power consumption is directly proportional to the length of the voltage interrupt time. An advantageous ratio for the operating voltage is 500 ms connected and 2.5 seconds disconnected, for example.

In the solution according to the invention, the main power supply (1, 2) of the device is used for the power supply and processors or corresponding circuits according to the systems already in use are used for monitoring the synchronization signals. Thus the component costs can be kept as low as possible while at the same time power consumption is reduced.

An essential element in the invention is an energy store (3) that contains extra energy for situations in which the need for energy increases temporarily. Such an energy store can be e.g. a capacitor which is charged using energy pulses from the power supply. The energy in the energy store is not used for the monitoring of signals. Thanks to this additional feature, the amount of energy in the energy pulse from the power supply can be better optimized to correspond to the energy needed by the processor, and the power consumption of the device can thus be reduced to minimum.

Extra energy is needed in situations in which the power supply unit must be returned from the periodic operation to the normal operation. Such a situation occurs when the processor detects a synchronizing signal combination which requires that the device enters a state that consumes more energy. Information about the transfer to the normal operation then has to be sent to the circuit controlling the primary of the power supply. In practice, the information can be sent by giving a trigger pulse or a corresponding control signal to the primary circuit side by means of an opto-isolator or transformer. A separate energy store is needed because a relatively large amount of current is required to drive the opto-isolator or the transformer.

Extra energy is also needed when the user of the device wants to start the device by means of a soft power switch. For the sake of convenience it is important that the device reacts to this immediately, not during the next voltage pulse. Therefore, there has to be enough energy available to send the trigger pulse to the circuit controlling the primary.

Furthermore, the energy consumption of the processor may temporarily increase from the average level during the execution of some routines. Such routines include e.g. writing to the EEPROM or verifying a measurement result. By providing said source of additional energy for the processor, the size of the energy pulse from the power supply can be optimized according to the average energy consumption by the processor.

It is obvious to a person skilled in the art that the above description of the use of synchronizing signals as control signals serves illustrative purposes only, and said control signals can be realized in many other ways as well. Furthermore, the invention is not limited to DPMS systems but can be applied to other types of monitors, too.

In this context, a monitor means any apparatus containing a picture tube, such as a computer display unit or a television set.

I claim:

1. A method for reducing power consumption in a monitor that has a power supply (1) which can be switched from a power saving state in which it generates a periodic pulsed output of power, to a non-power saving state in which it generates a continuous output of power, the monitor having processing means (4) for monitoring the presence of control signals (Deflection signals) received from an external source as well as having other circuits (5) for performing the operation of the monitor when in a non-power saving state, comprising the steps of:

1) periodically energizing the processing means for monitoring the condition of the control signals only when periodically energized, said processing means receiving periodic power from the power supply when the monitor is in the power saving state;

2) if the processing means determines that the control signals are not present when the processing means is periodically energized, maintaining the power supply and monitor in the power saving state; and 3) if the processing means determines that control signals are present when the processing means is periodically energized, the processing means causes the power supply and monitor to enter the non-power saving state.

2. The method of claim 1, further wherein said method stores energy in an energy storage element (3), wherein the stored energy is not used for powering the processing means (4), and wherein the energy stored in the energy storage element receives energy from the periodic operation of the power supply when the monitor is in the power saving state.

3. The method of claim 2, characterized in that the power supply (1, 2) for the processing means (4) monitoring said control signals is switched off for the duration of the interval between the control signal monitoring periods.

4. The method of claim 3 for reducing the power consumption in a monitor, wherein the power supply has a primary side and a secondary side, characterized in that the processing means and other circuits (4,5) are connected to the secondary side of the power supply and are switched off for the duration of the interval between the control signal monitoring periods.

5. A system for reducing the power consumption in a monitor comprising:

A) a power supply (1, 2) which can be switched from a power saving state in which it generates a periodic pulsed output of power, to a non-power saving state in which it generates a continuous output of power;

B) circuits (15) for operating the monitor; and

C) processing means (4) for receipt of external control signals so as to monitor the condition of said control signals, said processing means operating during the period of time when the power supply is periodically generating a pulsed output when in the power saving state so as to monitor the condition of the control signals at such times, as well as operating when the power supply is in the non-power saving state;

wherein the processing means periodically determines the state of the control signals when the processing means is periodically energized, and if the control signals are not present, maintains or causes the power supply to enter the power saving state if the power supply respectively was in or not in said state previously, and when control signals are detected when the processing means is periodically energized, it causes the power supply to enter its non-power saving state so as to cause the monitor to operate.

6. The system of claim 5, characterized in that the power supply (1,2) is arranged so as to switch off the power to the processing means (4) for the duration of the interval between the control signal monitoring periods.

7. The system of claim 6, wherein the power supply has a primary side and a secondary side connected to the processing means (4) and to the circuits (5), characterized in that the power supply is arranged so as to switch off the power to the processing means and the circuits (4,5) on the secondary side of the power supply for the duration of the interval between the control signal monitoring periods.

8. The system of claim 7, characterized in that the system also comprises an energy storage element (3) for storing energy which is received from the power supply (1, 2) including when the power supply is in the power saving state, and wherein if control signals are detected by the processing means (4), it causes the energy stored in the energy storage element to temporarily provide additional energy so as to activate the power supply.

9. The system of claim 8, characterized in that the energy storage element comprises a capacitor which is charged during the control signal monitoring periods.

10. The system of claim 9, characterized in that the amount of energy supplied by the power supply (1,2) during a control signal monitoring period is optimized to correspond to the amount of energy needed by the processing means (4) to periodically operate when the system is in the power saving state.

11. The system of claim 5, characterized in that the system also comprises an energy storage element (3) for storing energy which is received from the power supply (1, 2) including when the power supply is in the power saving state, and wherein if control signals are detected by the processing means (4), it causes the energy stored in the energy storage element to temporarily provide additional energy so as to activate the power supply.

12. The system of claim 11, characterized in that the energy storage element comprises a capacitor which is charged during the control signal monitoring periods.

13. The system of claim 5, characterized in that the amount of energy supplied by the power supply (1,2) during a control signal monitoring period is optimized to correspond to the amount of energy needed by the processing means (4) to periodically operate when the system is in the power saving state.

\* \* \* \* \*